United States Patent Office 2,702,536
Patented Feb. 22, 1955

2,702,536

AUTOMATIC CHOKE CONTROL

Harold A. Carlson, Brentwood, Mo., assignor to Carter Carburetor Corporation, St. Louis, Mo., a corporation of Delaware Application March 8, 1954, Serial No. 414,655

3 Claims. (Cl. 123—119)

This invention relates to internal combustion engines and, more specifically, to improvements in mechanisms for controlling the mixture ratio of fuel to air for combustion purposes in accordance with engine temperatures.

Where the engine is equipped with a carburetor, it is present practice to incorporate an automatic choke for controlling the mixture ratio for cold starting and proper engine operation during the engine warm-up period. Operation and construction of automatic chokes is well known to those skilled in the art and fully explained, for example, in the patent to I. E. Coffey, 2,325,372, of July 27, 1943, or in the patent to Henning, 2,421,733, of July 3, 1947. The present device more nearly resembles the structure shown in the Henning patent. The function of all these devices is substantially similar, and the problems encountered in the design of one such device will apply broadly to all.

In the devices of the prior art, a thermostat in the form of a coil spring is either calibrated for both temperature response and for spring response itself, or acts through a calibrated spring connection to close an unbalanced valve. The thermostat alone, or thermostat and spring, as the case may be, are generally strong enough to maintain the choke valve closed during cranking of the engine and, after the engine starts, are properly calibrated to position the valve when opened by suction forces acting on the valve directly, or indirectly by suction posterior of the throttle valve of the carburetor acting on a suction motor connected to the valve. The action of suction against the reaction of the spring balances the choke valve in predetermined positions according to temperature. The choke valve itself is thus controlled in its positions in accordance with an engine function and a temperature function. The effect of the position of the choke valve determines the amount of restriction in the air horn, and thus the amount of suction on the fuel nozzle of the carburetor. The degree of suction in turn determines the rate of fuel flow from the fuel bowl with respect to the rate of air being pumped in by the engine, or, in other words, the mixture ratio.

From the above discussion it will be apparent that, unless the thermostat spring reflects a tension corresponding to true engine temperature, then the fuel ratio will be inappropriate. The desirable system would obviously be one in which the rate of temperature rise or fall of the thermostat would correspond with that of the engine. With present systems this feature is only roughly approximated; consequently, hard starting is often experienced, especially in the intermediate range of engine temperatures.

Heretofore it has been common, as shown in the Coffey patent, to subject the thermostat spring to a current of heated air from a stove on the exhaust manifold. Such a system is satisfactory except under certain conditions, one of which results from operation of a cold engine for a short period of time only before the ignition is turned off. After a short interval of time, restarting is found not to be good because of the fact that the thermostat has cooled much faster than the engine. In such a case a fuel mixture far too rich for combustion is the cause of poor restarting.

In order to avoid the abovementioned difficulties, the present invention places the thermostat spring in a position to be heated, not only by the air passing over the exhaust, but also by the water jacket within the engine. With such a device having two sources of heat, the reaction of the thermostat spring more closely follows actual engine temperatures, so that temperature modulation of the choke valve will, in turn, reflect engine condition, and thereby produce the proper drop in pressure at the fuel nozzle for the proper mixture ratio.

By way of example, the accompanying drawings illustrate one form of the invention.

Fig. 3 is a section on the line 3—3 of Fig. 1 showing the position of the valve when the engine is cold and at rest.

Fig. 4 is a section on the line 3—3 of Fig. 1 showing the valve open partially after the engine starts.

Figure 1:
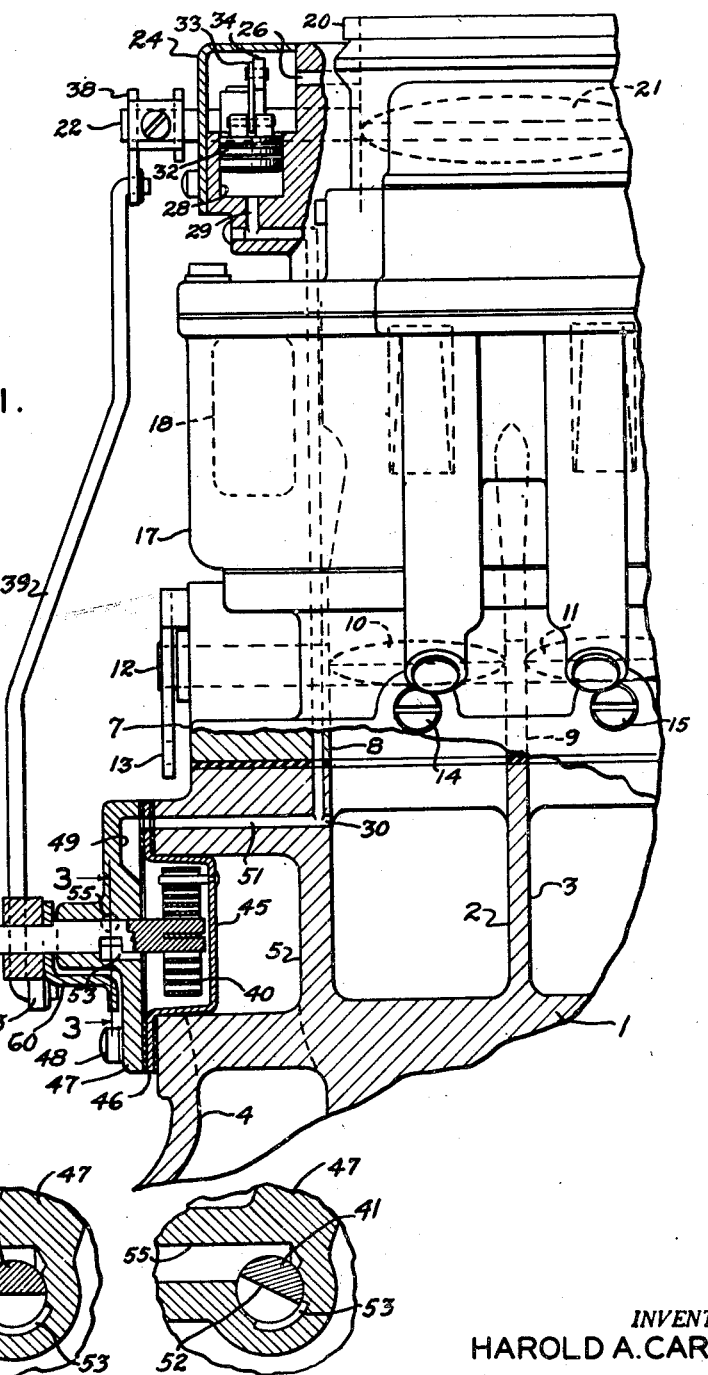
Fig. 1 is a front elevational view, partly in section, of a carburetor and manifold according to the present invention.

Referring to Fig. 1, the drawings illustrate an intake manifold 1 for an internal combustion engine (not shown). The manifold 1 is a dual type having two main ducts 2 and 3 which lead to separate groups of cylinders for the engine. A separate duct 4 within the manifold 1 forms a continuous passage to circulate water from the cooling system of the engine to and through a chamber 5 for a purpose which will be subsequently explained.

Mounted on the manifold 1 is a dual type carburetor 7 provided with separate mixture conduits 8 and 9 in registry with the intake ducts 2 and 3. The mixture conduits 8 and 9 contain the usual throttle valves 10 and 11 mounted on a shaft 12 and operated by a lever 13 suitably apertured for connection with the manual throttle control mechanism of the motor vehicle. Above the throttles 10 and 11 and within the mixture conduits 8 and 9 are suitable fuel nozzles for furnishing fuel when the throttles are open. The carburetor also has low speed fuel nozzles controlled by adjustable screws 14 and 15. It will be understood that the carburetor is conventional in construction and does not of itself constitute any part of the invention.

A fuel bowl 17 contains the usual float 18 for controlling the level of fuel within the bowl 17. A connection is provided between the fuel bowl 17 and each of the fuel nozzles, as will be readily understood by those familiar with carburetor structure. Within an air horn 20 which connects directly with the mixture conduits 8 and 9 is shown a choke valve 21 secured to a shaft 22 journaled in bearings in opposite sides of the air horn.

Figure 2:
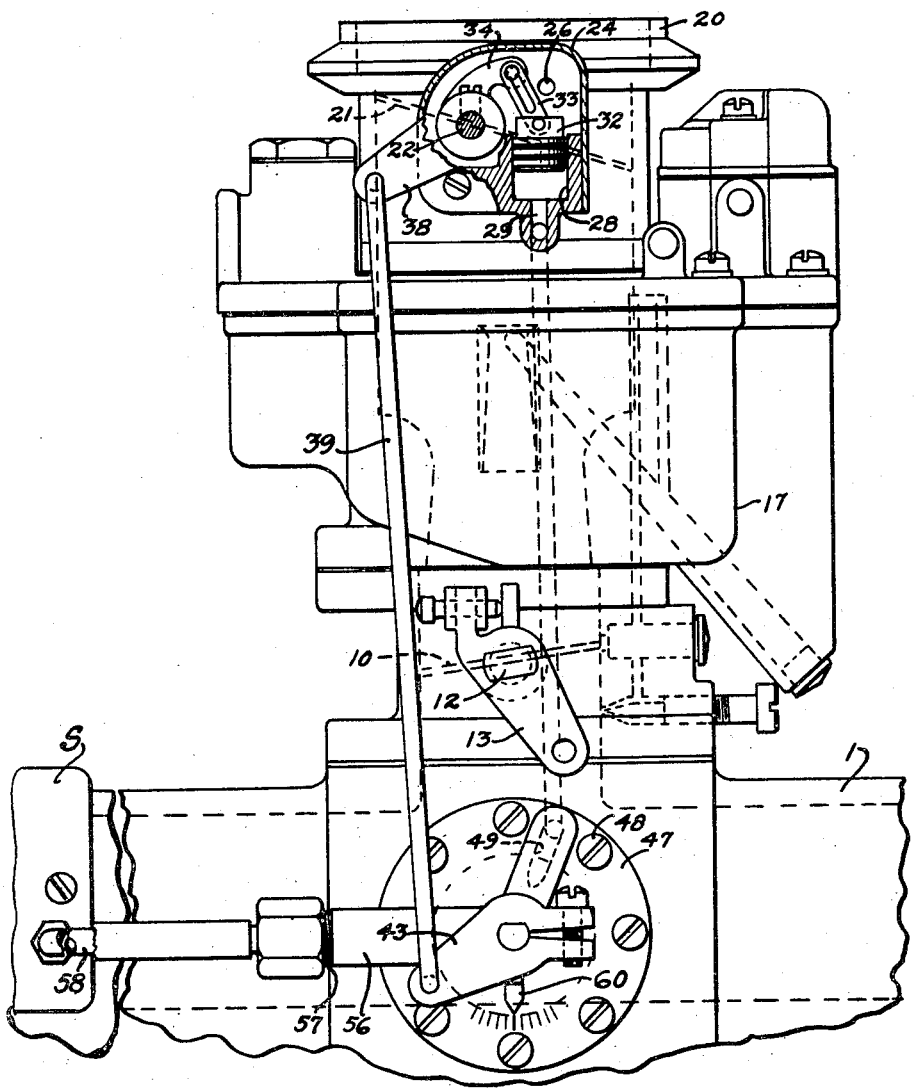
Fig. 2 is a side elevation of the carburetor and manifold according to the present invention.

As will be noted from Fig. 2, the choke valve 21 is of the unbalanced type generally used in automatic choke devices for the purpose explained in the Coffey and Henning patents above referred to. On the side of the air horn 20 is a casing 24 through which the shaft 22 projects. This casing has an atmospheric vent 26 to the air horn 20, and is formed with a cylinder 28 connected by passage 29 with the intake manifold by a port 30. Within the cylinder 28 is a piston 32 connected by way of a slotted link 33 to an arm 34 fixed on choke shaft 22.

With the present structure so far described, the operation of the engine will produce an inflow of air through the air horn 20 tending to turn the unbalanced valve 21 in a clockwise direction toward pull-open. Likewise, the piston 32 will be drawn down by manifold suction when present at the port 30. It will be understood that these forces are inversely variable depending upon engine speed and throttle opening.

In order to resist the opening of the choke valve 21 at times when the engine temperature is below normal operating temperatures, a thermostat mechanism is connected with the choke valve 21 by means of fixed arm 38 and link 39. The thermostat element 40 engages a pin in the casing 45 to rotate shaft 41 which, in turn, controls the choke valve 21 through an arm 43 fixed to shaft 41 and connected to the opposite end of link 39.

A pointer 60 on shaft 41 and graduations on the housing 47 indicate thermostat adjustment for rich and lean settings. The cap 47 can be rotated after the cap screws 48 are loosened so as to provide for this adjustment.

The thermostat 40 is enclosed within a cup-shaped housing 45 with a circumferential flange 46 in abutting relation with the periphery of the manifold surrounding the chamber 5. A bearing cap 47 anchors the flange 46 to the manifold by securing means such as cap screw 48 and appropriate gaskets so as to prevent the leakage of the coolant from the engine. Within the bearing cap 47 is a passage 49 registering with a similar passage 51 in the manifold which communicates with the intake duct 2 at the port 30 and also with the interior of the thermostat housing. These passages form an exhaust passage from the housing for the thermostat into the intake manifold.

As shown in Figs. 3 and 4, the shaft 41 is provided with a notch 52 in registry with an intake port 53 in the interior wall of the bearing cap. The recess 52 in the shaft is arranged to control communication between the intake port 53 and a passage 55 in the bearing cap. Nipple 56 containing passage 55 is threaded at 57 for connection with a tube 58 connected to the usual stove S of the type shown in L. B. Read Patent No. 2,262,408. Heated air from the stove on the exhaust manifold passes into the thermostat casing when intake port 53 is opened by valve 52, and exhausts to duct 2 through port 30. Operation of the valve 52 is controlled by the effect of temperature on the thermostat or operation of the choke valve by suction.

When the engine is cold, the water in the chamber 5 will also be at low temperature, and the thermostat 40 will be tensioned in a direction to rotate the arm 43 counter-clockwise and close the choke valve 21 during cranking of the engine. When the engine starts, suction posterior of the throttle in the intake passage 2 will be communicated to piston 32 through the passages 29 to the cylinder 28. This piston is calibrated of a size sufficient to overcome the resistance of the thermostat and open the choke valve 21 at least partially. It will be understood that at speeds above fast idle the unbalance in the choke valve 21 provides an increasing force to open the choke valve still further as the engine speeds up.

The action of the piston 32 above described rotates the shaft 41 to open the valve 52 and allow air from the stove to enter by way of the tube 58, passage 55, and port 53. The air from the stove will pass from the port 53 into the thermostat housing 45 and out through the passages 49, 51 to the port 30. Since the heated air will also come in contact with the water jacket, its temperature will be somewhat modulated to slow down the rate of expansion of the thermostat. This effect can be increased or decreased by the use of baffles. As the engine temperature increases, the temperature of the air entering the thermostat housing 45 increases, causing the spring resistance of the thermostat to decrease, thereby relaxing the tension transmitted through the linkage 43, 39, 38 to allow the choke valve to open gradually. As the temperature of the engine further increases, the tension in the thermostat continues to relax until the choke valve assumes a wide-open position when normal engine running temperatures are attained.

At the same time that the temperature is increasing within the housing 45, the coolant circulating through the chamber 5 will be gradually increasing in temperature. However, if, before or after the coolant reaches a temperature corresponding to normal engine operating temperatures for the coolant, the operator of the car stops the vehicle and turns off the ignition, the rate of cooling of the thermostat 40 will be retarded due to the presence of the warm water within the chamber 5. Instead of the thermostat cooling rapidly due to the lack of circulation of heated air, the thermostat rate of cooling is retarded by the presence of the heat within the coolant, which will warm the wall of the thermostat housing 45. Consequently, the thermostat will not be subject to rapid changes in temperature, and its response will more nearly correspond to the rate of heating or cooling of the engine.

If, after a short interval of a few minutes, the starting procedure is repeated, the choke valve will not be closed completely, and there will be less likelihood of the engine flooding.

The present arrangement, therefore, provides a thermostat with two sources of heat, the combination of which will produce an action of the choke valve 21 to provide the proper restriction during the warm-up and for starting the engine in the intermediate ranges of engine temperatures.

A structure has been described which will carry out all of the objects of the present invention, but it is contemplated that other embodiments using the same principle will be obvious to those skilled in the art without departing from the spirit of the invention as defined by the appended claims.

I claim:

1. In combination with an internal combustion engine having intake and exhaust conduits and a cooling water chamber, a choke valve in said intake conduit, and an automatic control for said valve including a housing mounted on said chamber, a thermostat in said housing operatively connected to said valve, and a hot air connection from said housing to an exhaust heated stove for heating said thermostat upon operation of the engine, said water chamber serving as a heat storing device for applying heat to said thermostat after the cessation of the supply of heated air through said connection.

2. In combination, an engine and a carburetor for said engine comprising a source of fuel, a mixture conduit, a fuel nozzle in said conduit in communication with said source, a throttle valve for controlling the flow through said conduit, and a device to control the mixture ratio delivered from said mixture conduit, including a valve in said carburetor, temperature responsive means modifying the action of said valve, and independently operating means for applying heat to said temperature responsive means.

3. In combination, an engine and a carburetor for said engine comprising a source of fuel, a mixture conduit, a fuel nozzle in said conduit in communication with said source, a throttle valve for controlling the flow through said conduit, and a device to control the mixture ratio delivered from said mixture conduit, including a valve in said carburetor, temperature responsive means modifying the action of said valve, separate sources of heat for said temperature responsive means, and independent means to apply heat to said temperature responsive means with each of said independent means deriving its heat from a separate one of said sources.

No references cited.